Nov. 4, 1930.  R. A. LINCOLN  1,780,238
WEIGHT INDICATOR
Original Filed July 31, 1924

Inventor:
Robert A. Lincoln,
by Spear, Middleton, Donaldson & Hall
Attys.

Patented Nov. 4, 1930

1,780,238

UNITED STATES PATENT OFFICE

ROBERT A. LINCOLN, OF TONKAWA, OKLAHOMA, ASSIGNOR OF ONE-HALF TO AMERICAN IRON & MACHINE WORKS, INC., OF TONKAWA, OKLAHOMA, A CORPORATION OF OKLAHOMA

WEIGHT INDICATOR

Original application filed July 31, 1924, Serial No. 729,340. Divided and this application filed March 23, 1928. Serial No. 264,246.

This invention relates to weight indicators for use in connection with rotary well drilling apparatus and more particularly to a device of this character which will be simple and durable of construction and which may be readily transported from place to place, thereby meeting the three greatest requirements of such an article employed in oil fields.

An object of the invention is to provide a device which is capable of use with the pulling apparatus of a rotary well drilling rig and which has in combination therewith means capable of adjustment for preventing too great a portion of the weight of the drilling apparatus being supported from the hoisting apparatus.

A further object of the invention is to provide a novel construction of weight indicator for indicating the weight supported by the hoisting apparatus.

Other objects will appear hereinafter.

The invention consists in the features, combination and arrangement of parts hereinafter described, and particularly pointed out in the claims.

Figure 1:
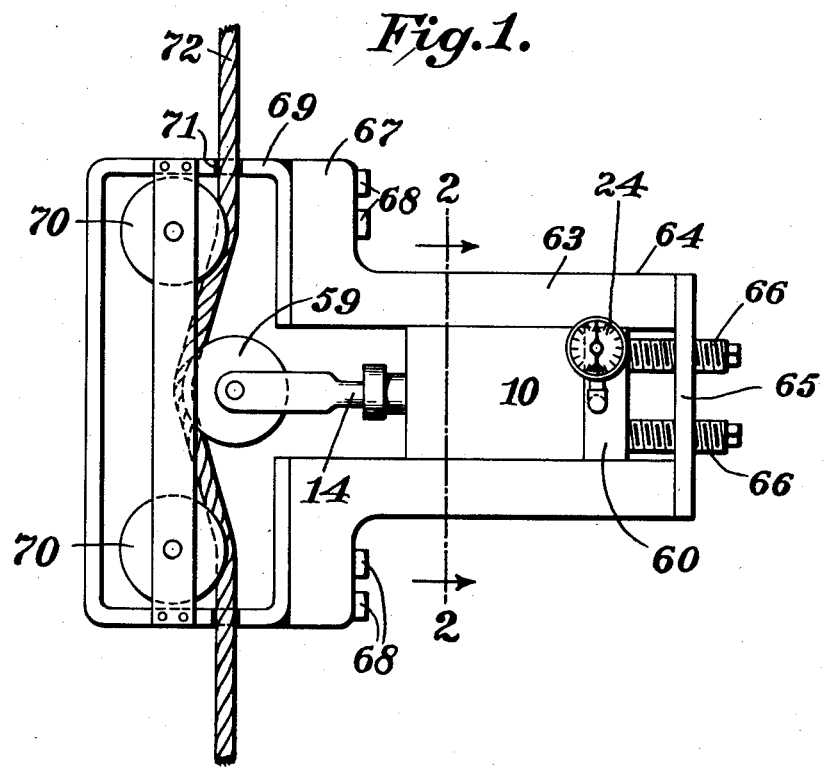
Figure 1 is a side elevation of an embodiment of my invention partially in section.
Figure 2:
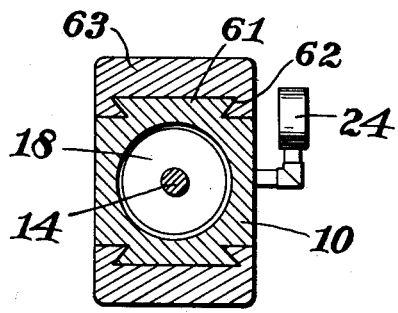
Fig. 2 is a section on line 2—2 of Fig. 1.

A cylinder 10 is provided with a piston 18 having a piston rod 14 extending through one end of the cylinder and carrying at its free end a grooved pulley wheel 59. The cylinder has preferably but one removable head 60 in which a pressure gauge 24 is so mounted that it will indicate the pressure within the cylinder. The cylinder head 60 is fairly heavy of construction and the walls of the cylinder and head having dove-tails 61 at opposite sides which engage in dove-tail grooves 62 formed in the arms 63 of a U-shaped yoke or frame 64. The head 60 of the cylinder opposes the bight portion 65 of the yoke and through this bight portion adjusting screws 66 are mounted to engage the head and force the cylinder in one direction along the grooves 62.

The ends of the arms 63 of the yoke are provided with angular projections 67 to which is bolted as at 68 a casing 69 having one open side. Within this casing are rotatably mounted in bearing means comprising a pair of grooved sheaves 70 which when the casing is bolted to the yoke are in the same vertical plane with the sheave 59 of the piston rod 14. The upper and lower end walls of the casing 69 have formed therein notches 71 through which the line 72 may be introduced. This line in this instance may be either the dead-line of the hoisting apparatus or the actual supporting line and in the latter case the device acts as a spooling guide for the line.

In the operation of this device the line is introduced through the open side of the casing 69 into the notches and engaged in the pulleys 70. The screws 66 are then tightened to force the pulley 59 into engagement with the line between the pulleys 70 to kink the line. The line in its tendency to straighten places pressure against the pulley 59 and accordingly against the piston 18, with the result that the gauge 24 gives a reading in accordance with the pressure to which the piston is subjected. The tendency of the line to straighten under weight of the drilling apparatus is thus accurately indicated.

Where in the appended claims a line of the hoisting apparatus is referred to, the reference thereto is made in a generic sense to mean either the dead line or the hoisting line.

This application is a division of that filed July 31, 1924, weight indicators, 729,340.

I claim:

1. In a weight indicator for well drilling apparatus, the combination of an indicator, a cylinder and piston, means between the piston and a line of hoisting mechanism, which is adapted to engage an intermediate stretch of said line and normally deflect it from its straight course, said line under its tendency to straighten out due to pull thereon moving the piston to effect an indication, and adjustable means in engagement with said cylinder to allow said line to straighten out and lower the apparatus when the indicator shows excessive pressure.

2. In a weight indicator for well drilling apparatus, the combination of an indicator, a cylinder and piston, means between the piston and a line of hoisting mechanism, which is adapted to engage an intermediate stretch of said line and normally deflect it from its straight course by pushing it away from said cylinder, said line under its tendency to straighten out due to pull thereon, pushing the piston to effect an indication, said piston and cylinder having their axes extending in a direction transverse to the general direction of the line and means for manually adjusting the cylinder and piston relative to each other.

3. In a weight indicator for well drilling apparatus, the combination of an indicator, a cylinder and piston, means between the piston and a line of hoisting mechanism, which is adapted to engage an intermediate stretch of said line and normally deflect it from its straight course by pushing it away from said cylinder, said line under its tendency to straighten out due to pull thereon moving the piston to effect an indication and means of adjustment in engagement with said cylinder to allow said line to straighten out and lower the apparatus when the indicator shows excessive pressure.

4. In a weight indicator for well drilling apparatus, the combination of a frame, a cylinder slidably mounted in said frame, a piston in said cylinder having a piston rod adapted to extend into engagement with an intermediate stretch of the line of the hoisting apparatus to normally deflect the same from its straight course, an indicator connected to said cylinder, and adjustable means in said frame, engaging said cylinder, to control the tension in the line.

5. In a weight indicator for well drilling apparatus, the combination of a frame, a cylinder slidably mounted in said frame, a piston in said cylinder having a piston rod with a terminal pulley thereon, said piston rod extending to position its pulley in engagement with an intermediate stretch of the line of the hoisting apparatus to normally deflect the line from its straight course, an indicator connected to said cylinder, means in said frame for adjusting the slidable cylinder in the frame to regulate the tension in the line under the weight of the drilling apparatus, and a pair of pulleys in said frame one above and one below said deflecting pulley for preventing deflection of the line except therebetween.

In testimony whereof, I affix my signature.

ROBERT A. LINCOLN.